Patented Apr. 10, 1934

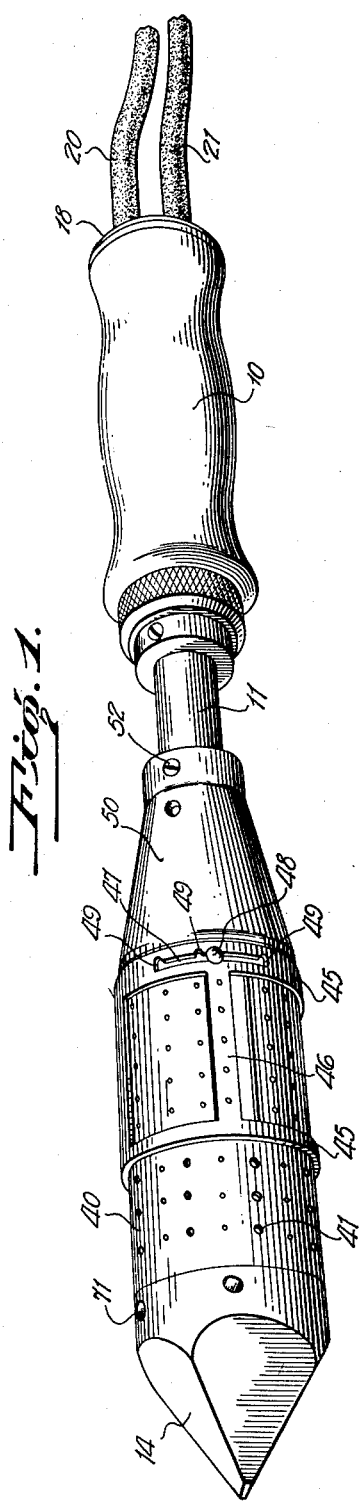

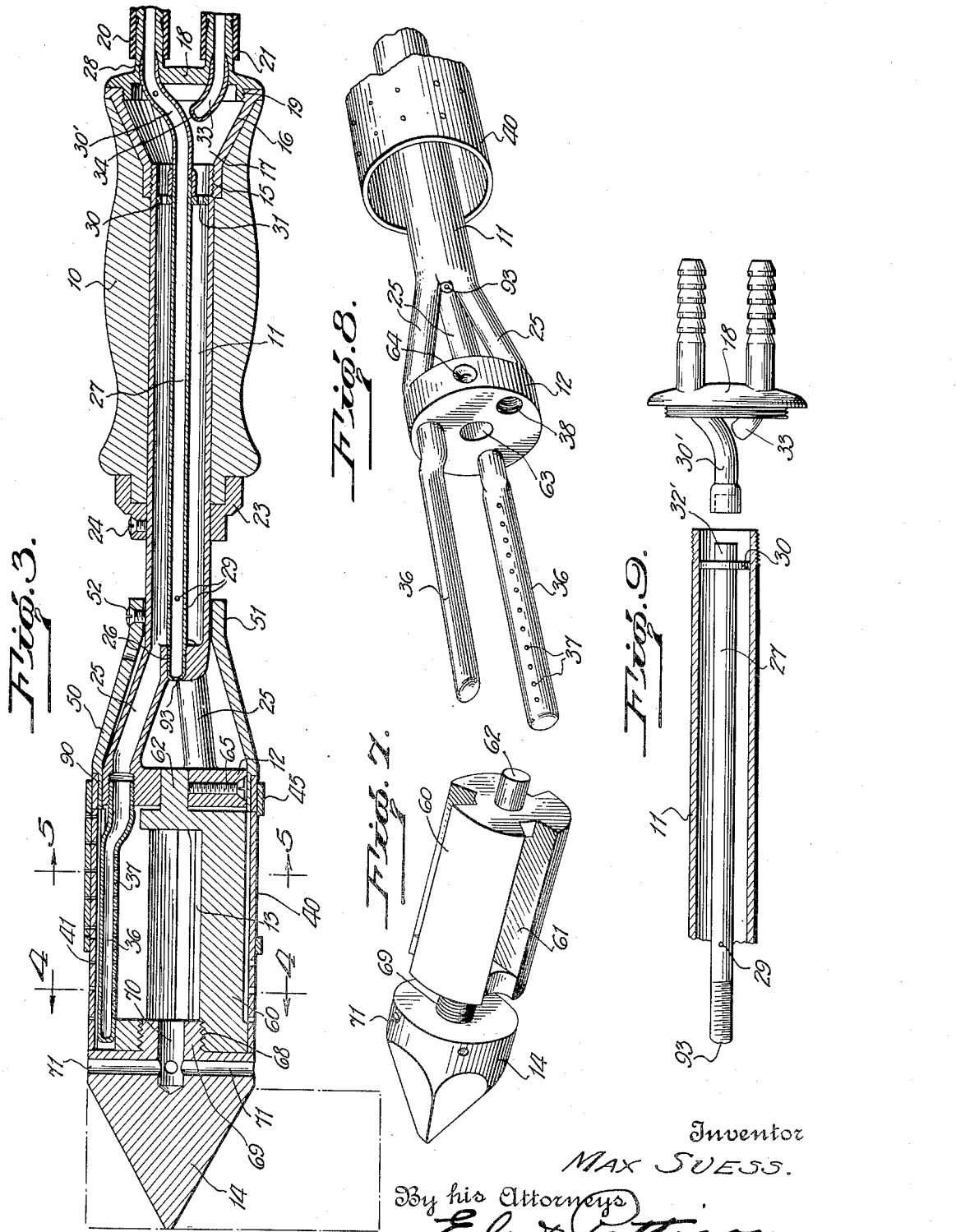

1,954,503

UNITED STATES PATENT OFFICE 1,954,503

SELF HEATING TOOL

Max Suess, New York, N. Y.

Application March 22, 1932, Serial No. 600,388

14 Claims. (Cl. 158—26)

The present invention relates to new and useful improvements in self heating tools, and while the invention has been herein illustrated in a self heating tool of the soldering iron type, it is to be understood that the invention is not limited to tools of this type, and that certain features thereof are capable of embodiment in self heating tools of other types.

One object of the present invention is to improve the construction and mode of operation of self heating tools and to so construct such tools that their manufacture and operation may be considerably simplified.

A feature of the present invention consists in the provision in a self heating tool, of a unitary structure of certain of the parts whereby the assembly of the several parts is greatly simplified.

A further feature of the invention resides in a new and novel arrangement of a plurality of fuel burners, and the means by which fuel is supplied thereto.

A further object of the invention resides in a new and novel construction and arrangement of combustion chamber in tools of the aforementioned type.

Still a further feature of the present invention resides in the combination with a combustion chamber, of a heat retaining element and heat retaining head for the tool.

Still a further feature of the invention resides in a novel form of fuel mixing chamber, and burners and the construction of these elements whereby said elements form the support for the various parts of the tool.

Other features of the invention relate to certain novel and improved constructions, arrangements and combinations of parts hereinafter described, and particularly pointed out in the claims, the advantages of which will be readily understood and appreciated by those skilled in the art.

The invention will be clearly understood from the accompanying drawings illustrating the invention in its preferred form, and the following detailed description of the construction therein shown.

In the drawings;

Figure 1 is a perspective view of a self heating soldering iron constructed in accordance with the present invention, Figure 2 is a view partly in longitudinal section, and partly in elevation of the soldering iron, a portion of the soldering head being broken away, Figure 3 is a longitudinal sectional view of the soldering iron, Figure 4 is a detail sectional view on the line 4—4 of Figure 3, Figure 5 is a detail sectional view taken on the line 5—5 of Figure 3, Figure 6 is a detail sectional view taken on the line 6—6 of Figure 2, Figure 7 is a detail perspective view illustrating the soldering head, and a heat retaining element used in connection therewith, Figure 8 is a detail perspective view showing the mixing chamber and the burners, and;

Figure 9 is a detail longitudinal sectional view of a portion of the device.

In the accompanying drawings, the invention is illustrated in a self heating soldering iron of the gaseous fuel burning type, and when so embodied the device comprises a handle 10, a mixing chamber 11, a burner head 12, a combustion chamber 13, and a soldering head 14.

The handle 10 is carried by the combustion chamber which latter is preferably in the form of an elongated tubular member. Threaded upon one end of the tubular member as at 15, there is a flared member 16 which is so constructed as to provide a chamber 17. A cap or similar member 18 is threaded as at 19 into the end of this flared member 16 and leading through said cap 18 there are two pipe connections 20 and 21, the purpose of which will be hereinafter more specifically referred to. The handle 10 is secured in position upon the flared member 16 and a ferrule 23, which latter is secured against movement relative to the mixing chamber 11 by a suitable fastening 24 herein illustrated as a set screw.

The opposite end of the mixing chamber 11 is provided with a plurality of tubular extensions 25 of which in the present embodiment of the invention, there are three. These tubular extensions 25 are angularly disposed with respect to the longitudinal axis of the mixing chamber 11 and are preferably formed integral with the burner head 12 heretofore mentioned. That portion of the mixing chamber which lies adjacent the base of the tubular extension 25 is provided with a passage way 26, and secured in said passage way and extending rearwardly of the mixing chamber 11, there is an air supply pipe 27, the opposite end of which is connected as at 28 to the pipe connection 20 heretofore mentioned as leading through the cap-like member 18. This pipe 27 has a plurality of openings 29 disposed at intervals throughout its length and adjacent the rear end of the pipe, said pipe is supported by an internal collar or the like 30, which has a plurality of passages 31 therein. Thus, the pipe 27 is supported at its forward end by the walls of the passage 26, at its rear end by the cap like member 18 and adjacent its rear end by the collar 30. This pipe 27 is adapted to supply air to the mixing chamber 11 and it is to be understood that the pipe connection 20 heretofore mentioned will be connected to any suitable air supply.

The pipe connection 21 heretofore mentioned is connected to any suitable gas supply, and a relatively short pipe 33 extends through the cap like member 18 and is provided with a discharge orifice 34 by means of which gas may be introduced into the chamber 17 from which it passes through the perforations of the collar 30 into the mixing chamber 11 to be mixed with air supplied thereto by the pipe 27. Suitable control means may be provided in the pipe connections 20 and 21 to regulate the supply of air and gas respectively to the mixing chamber.

Removably carried by, and extending forwardly of the burner head 12 there is a plurality of burners 36. Each of these burners comprises a tubular member having closed ends and provided throughout its length with a plurality of spaced perforations or openings 37. These burners are preferably threaded into internally threaded openings 38 in the burner head 12, and these openings are preferably arranged in alinement with the ends of the angular tubular extensions 25 heretofore mentioned.

Surrounding the combustion chamber 13, there is a shell like member 40 which is provided with a plurality of perforations 41. This shell like member 40 also has a plurality of longitudinally extending slots 42 which serve the purpose of sight openings in order that the interior of the combustion chamber may from time to time be inspected. The perforations 41 in this shell like member 40 permit of the free circulation of air within the combustion chamber 13, thus insuring proper combustion of the flames of the several burners 36. Means is provided to open and close the sight openings 42, heretofore mentioned, and this means comprises a pair of spaced bands 45 connected by members 46, which construction provides a skeleton sleeve-like member, the members 46 of which are adapted to be moved over the sight openings 42 to close the same and away from said sight openings to open the same by a rotary movement of the bands 45. One of the bands 45 may be provided with a slot 47 and said slot receives a pin 48 to guide the bands in their movement, and said slot may be provided with notches or the like 49, for engagement with the pin 48 to hold the bands 45 against rotary movement in either adjusted position thereof, it being understood that in order to engage the notches 45 with the pins 48, a slight movement longitudinally of the sleeve like member 41 is imparted to the band 45.

The shell like member 41 and the bands 45 are supported at one end by a flared member 50 which has a reduced portion 51 which latter embraces the mixing chamber 11, and which is secured thereto by means of set screw 52. The flared end of this member 50 is of a size which will frictionally engage the outer peripheral edge of the burner head 12, and this construction forms a positioning and supporting means for the flared end of the member 50.

Mounted in the combustion chamber 13 and within the shell like member 40, there is a heat retaining element 60. This heat retaining element 60 is substantially cylindrical in shape and is provided with longitudinally extending channels 61. Projecting from one end of said heat retaining element, there is an axial stub extension 62, the purpose of which will be hereinafter described.

The axial stub extension 62 of the heat retaining element 60 is adapted to be received in an opening 63 in the burner head 12, and passing radially through said burner head and intersecting the opening 63 there is a passage 64 which is adapted to receive a set screw 65, the inner end of which engages the extension 62 to secure the heat retaining element in position. The channels 61 of the heat retaining element are adapted to receive the burners 36 as best illustrated in Figures 4 and 5, and by this arrangement the burners 36 are intimately associated with said heat retaining element in such a manner that the flames of the burners will be in close contact with the heat retaining element in order to impart heat thereto. The opposite end of the heat retaining element 60 is provided with a threaded opening 68, and the soldering head 14 heretofore mentioned, has a screw threaded extension 69 adapted to be received in this opening to secure the soldering head in place. By this construction, soldering heads of various sizes to more efficiently handle the work in hand may be substituted for one another. Each of the soldering heads will be provided with a heat chamber 70, and extending radially of the heat chamber 70 there is a plurality of passages 71 which extend through the soldering head.

By inspection of Figure 3 it will be noted that the base of the soldering head, or that portion thereof which surrounds the threaded extension 69 engages the open end of the shell like member 41, and provides the end wall of the combustion chamber 13.

The device is assembled in the following manner: The mixing chamber and the air pipe 27 are first assembled as illustrated in Figure 9. After this has been done, the flared member 50 and the ferrule 23 are moved therealong, after which the handle 10 may be placed in position thereon. As thus far assembled, the flared member 16 is then threaded on the end of the mixing chamber 11 and the cap member 18 is then threaded into the flared end of the member 16. The end of the pipe section 30' is then engaged with the extension 32' of the pipe 27 and the cap member 18 may then be screwed home in the end of the flared member 16, the concentric relation of the pipe 27 and the end of the pipe 30' permitting of this operation. The ferrule 23 is next moved up and secured by the set screw 24 to firmly hold the handle 10 between itself and the flared member 16.

The device having been assembled as thus far described, the flared member 50 is moved to proper position after the shell like member 40 has been positioned thereon and this flared member 50 is then secured in place by the set screw 52. Before the shell like member was positioned however, the heat retaining element 60 was positioned in the combustion chamber to be formed by the shell like member 40 with its axial extension in the opening 63 of the burner head 12.

In some instances, the flared member 50 and the shell like member 40 may be brazed or otherwise connected together as at 90, and in this type of construction, in order that access may be had to the set screw 65, it would be necessary to loosen the set screw 52 and move the flared member 50 to the right in Figure 3 sufficient distance that when the same were rotated one of the sight openings 42 heretofore described would overlie the set screw 65 and thereby permit of the same being loosened to permit of removal of the heat retaining element or tightened to secure the same in position.

After the device has thus far been assembled, the soldering head 14 may be positioned by engaging its threaded extension 69 with the threaded recess 68 and screwing the same home until it engages the end of the shell like member 40.

The device operates in the following manner:

Gas and air being introduced to the mixing chamber as heretofore described are mixed to provide a combustible fuel which is led through the tubular extension 25 to the burners 36 where it is ignited in any desired manner. The flame of the burner is projected against the heat retaining element 60, and heats the same, which heat is transmitted through the heating chamber 70 and radial passages 71 to heat the soldering head 14.

By reference to Figures 3 and 9, it will be noted that the inner end of the air pipe 27 is provided with a small discharge opening or jet 93, which projects a stream of air into direct contact with the burner head 12 and thereby maintains this portion of the soldering iron cool and prevents its overheating.

From the foregoing it will be apparent that the present invention provides a new and novel form of self heating soldering iron, which is simple in construction and in which the several essential parts are capable of removal or replacement or repair.

While the invention has been herein illustrated in a preferred form, it is to be understood that the invention is not to be limited to the specific construction herein shown and that it may be practiced in other forms without departing from the spirit thereof.

Having thus described the invention, what I claim as new and desire to secure by Letters Patent, is:—

1. In a self heating tool of the class described, a hollow handle forming a mixing chamber, means for introducing air to said mixing chamber, means for introducing gas to said mixing chamber, a combustion chamber, and a plurality of equally spaced separate burners arranged circumferentially around said combustion chamber and having communication with the mixing chamber.

2. In a self heating tool, a hollow handle forming a mixing chamber, a comubstion chamber, a plurality of burners arranged in the combustion chamber and having communication with the mixing chamber, a heat retaining element mounted in said combustion chamber in intimate relation with said burners, and a heat transfer head carried by said heat retaining element and arranged exteriorly of the combustion chamber.

3. A self heating tool comprising in combination, a mixing chamber, a combustion chamber, a plurality of tubular burners arranged in said combustion chamber and having communication with the mixing chamber, a heat retaining element in said combustion chamber and substantially filling the same, and a soldering head carried by the heat retaining element and closing one end of the combustion chamber.

4. A self heating tool comprising in combination, a mixing chamber, a combustion chamber, a plurality of tubular burners extending longitudinally of the combustion chamber, a heat retaining element substantially filling the combustion chamber and having channels in which the burners are mounted, and a heat retaining head closing the end of said combustion chamber.

5. A self heating tool comprising in combination, a handle, a combustion chamber carried by the handle, a plurality of burners mounted in said combustion chamber, a heat retaining element mounted in said combustion chamber in intimate relation with the burners, and a heat retaining head closing one end of said combustion chamber.

6. A self heating tool comprising in combination, a handle, a combustion chamber carried by the handle, a plurality of burners mounted in said combustion chamber, a heat retaining element mounted in said combustion chamber in intimate relation with the burners, and a heat retaining head closing one end of said combustion chamber, said heat retaining head being removably attached to said heat retaining element.

7. A self heating tool comprising in combination, a handle, a combustion chamber carried by the handle, a plurality of burners mounted in said combustion chamber, a heat retaining element mounted in said combustion chamber in intimate relation with the burners, and a heat retaining head closing one end of said combustion chamber, said heat retaining head being removably attached to said heat retaining element, said heat retaining head having heat conducting passages extending therethrough.

8. A self heating tool comprising in combination, a handle, a combustion chamber carried by the handle, a plurality of burners mounted in said combustion chamber, a heat retaining element mounted in said combustion chamber in intimate relation with the burners, and a heat retaining head closing one end of said combustion chamber, said heat retaining head being removably attached to said heat retaining element, said heat retaining head having an axial heat chamber and heat conducting passages extending radially therethrough.

9. In a self heating tool, a mixing chamber, and a combustion chamber, means for supplying gas to said mixing chamber and means for supplying air to said mixing chamber, said air supplying means being constructed and arranged to project a blast of air upon one end of the combustion chamber to prevent over-heating thereof.

10. In a self heating tool, an elongated tubular member forming a fuel mixing chamber, a plurality of separate integral tubular extensions projecting from said tubular member, a burner head formed integral with said extensions and a plurality of burners extending from said burner head.

11. A self heating tool comprising in combination, an elongated tubular member forming a fuel mixing chamber, a plurality of separate integral tubular extensions projecting from said tubular member, a burner head, a combustion chamber, and a soldering head, said combustion chamber and soldering head being carried by said mixing chamber and said burner head.

12. A self heating tool comprising in combination, an elongated tubular member forming a fuel mixing chamber, a plurality of separate integral tubular extensions projecting from said tubular member, a burner head formed integral with said tubular extension, a plurality of burners extending from said burner head, a combustion chamber enclosing said burner head and said burners, a heat retaining element mounted in said combustion chamber, means for supporting said heat retaining element from said burner head and a soldering head removably carried by said heat retaining element.

13. In a self heating tool, a combustion chamber, a heat retaining element substantially filling the combustion chamber and having a plurality of longitudinally extending channels in its outer surface, and a plurality of burners mounted in said combustion chamber and positioned in the channels of the heat retaining element.

14. In a self heating tool, an enclosed combustion chamber having perforated side walls, a tubular mixing chamber, and means for supporting the combustion chamber from the mixing chamber, said means comprising a flared member having one end secured to the mixing chamber and having its opposite end positioned within one end of the combustion chamber.

MAX SUESS.